US012634609B2

(12) United States Patent
Gui et al.

(10) Patent No.: US 12,634,609 B2
(45) Date of Patent: May 19, 2026

(54) SPEAKER MODULE HOUSING AND SPEAKER MODULE

(71) Applicant: AAC Microtech (Changzhou) Co., Ltd., Changzhou (CN)

(72) Inventors: Hailiang Gui, Changzhou (CN); Jie Yuan, Changzhou (CN); Siyuan Ni, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 161 days.

(21) Appl. No.: 18/434,861

(22) Filed: Feb. 7, 2024

(65) Prior Publication Data

US 2024/0334103 A1 Oct. 3, 2024

Related U.S. Application Data

(63) Continuation of application No. PCT/CN2023/090400, filed on Apr. 24, 2023.

(30) Foreign Application Priority Data

Apr. 3, 2023 (CN) ........................ 202320710138.5

(51) Int. Cl.
*H04R 1/02* (2006.01)

(52) U.S. Cl.
CPC .................................... *H04R 1/025* (2013.01)

(58) Field of Classification Search
CPC ........ H04R 1/025; H04R 31/006; H04R 9/06; H04R 2499/11
See application file for complete search history.

(56) References Cited

FOREIGN PATENT DOCUMENTS

| | | | | |
|---|---|---|---|---|
| CN | 206367156 U | * | 8/2017 | ............. B29C 45/27 |
| CN | 212628255 U | * | 2/2021 | ............... H04R 9/06 |

* cited by examiner

*Primary Examiner* — Devona E Faulk
(74) *Attorney, Agent, or Firm* — Wiersch Law Group

(57) ABSTRACT

Speaker module housing and speaker module, the speaker module housing includes front shell with accommodating cavity and back cover fixed to front shell and covering accommodating cavity. Front shell has gate region for injection molding and fixed region opposite to gate region and away from gate region. Thickness of part of front shell between gate region and fixed region is smaller than thickness of fixed region. Speaker module housing further includes plastic structure fixed in accommodating cavity. Plastic structure and front shell are integrally injection-molded, and plastic structure is located in gate region and/or fixed region. Plastic structure is arranged in gate region and/or fixed region of front shell, so that part of front shell located in gate region and fixed region has sufficient plastic thickness, which extends effective holding time of shrinkage position of front shell and reduce risk of shrinkage in fixed region of front shell.

8 Claims, 3 Drawing Sheets

SPEAKER MODULE HOUSING AND SPEAKER MODULE

TECHNICAL FIELD

The disclosure belongs to the technical field of speaker modules, and in particular, relates to a speaker module housing and a speaker module.

BACKGROUND

As an important element of equipment that provides sound playback, such as a radio, a mobile phone, or a Walkman, a speaker transmits a sound wave signal to a user's ears, which may prevent an influence of sound produced by a sound player on people around, or prevent hearing of the sound by people who should not hear it. Therefore, the speaker is used quite frequently in daily life. A housing of a speaker module includes a front shell, a back cover, and an electrode sheet. The electrode sheet is fixed to the front shell and is configured to pass a current to a sound-generating unit of the speaker module.

During molding of the front shell of the speaker module in the related art, due to thinness of an injection molding position of the front shell and a shell part away from the injection molding position of the front shell, part of the front shell is prone to shrinkage during injection molding.

Therefore, there is a need to provide a new speaker module housing.

SUMMARY

An objective of the disclosure is to provide a speaker module housing and a speaker module, which can solve the problem in the related art that the speaker module housing is prone to shrinkage during injection molding.

The technical solution of the disclosure is as follows.

A speaker module housing, including a front shell with an accommodating cavity and a back cover fixed to the front shell and covering the accommodating cavity, the front shell having a gate region for injection molding and a fixed region opposite to the gate region and away from the gate region, and a thickness of at least part of the front shell between the gate region and the fixed region is smaller than a thickness of the fixed region, the speaker module housing further includes a plastic structure fixed in the accommodating cavity, the plastic structure and the front shell are integrally injection-molded, and the plastic structure is located in the gate region and/or the fixed region.

As an improvement, a thickness of the front shell in the gate region is smaller than a thickness in the fixed region, and the plastic structure includes a first plastic member fixed to the front shell and located in the gate region.

As an improvement, the gate region and the fixed region are respectively located at two opposite ends of the front shell, and a length extending direction of the first plastic member extends from the gate region towards the fixed region.

As an improvement, the accommodating cavity includes a receiving cavity and a first process cavity spaced apart from the receiving cavity and located in the gate region, and the first plastic member includes a first plastic body connected to a cavity wall of the first process cavity and a second plastic body with two ends respectively connected to the first plastic body and a cavity wall of the receiving cavity.

As an improvement, the accommodating cavity further includes a second process cavity spaced apart from the receiving cavity and opposite to the first process cavity, the fixed region is located in the middle of the second process cavity, a thickness of the front shell on an end portion of the second process cavity is smaller than a thickness in the fixed region, and the plastic structure further includes a second plastic member fixed to the end portion of the second process cavity.

As an improvement, a surface on an end of the second plastic member close to the fixed region is a bevel surface.

As an improvement, the front shell includes a shell body having an accommodating cavity and a fixed portion fixed to the shell body, the fixed portion forming the fixed region on the shell body.

As an improvement, the speaker module housing further includes a locating member fixed in the accommodating cavity, the locating member being configured to fix a sound-generating unit of a speaker module.

A speaker module, including the speaker module housing as described in any one of the above and a sound-generating unit fixed in the speaker module housing, the sound-generating unit being located between the gate region and the fixed region.

As an improvement, the speaker module further includes an electrode sheet fixed to the fixed region and a connecting sheet located in the accommodating cavity and respectively electrically connected to the sound-generating unit and the electrode sheet, the connecting sheet being fixedly connected to the front shell.

The disclosure has the following beneficial effects. The plastic structure is arranged in the gate region and/or the fixed region of the front shell, so that a part of the front shell located in the gate region and the fixed region has a sufficient plastic thickness, which prevents ineffective holding for thick glue in the fixed region of the front shell caused by quick freezing of plastic during the injection molding due to local excessively-thin plastic of the front shell, and compared with the related art, can extend an effective holding time of a shrinkage position of the front shell and reduce a risk of shrinkage in the fixed region of the front shell.

DESCRIPTION OF EMBODIMENTS

The disclosure is further described below with reference to the accompanying drawings and embodiments.

Figure 2:
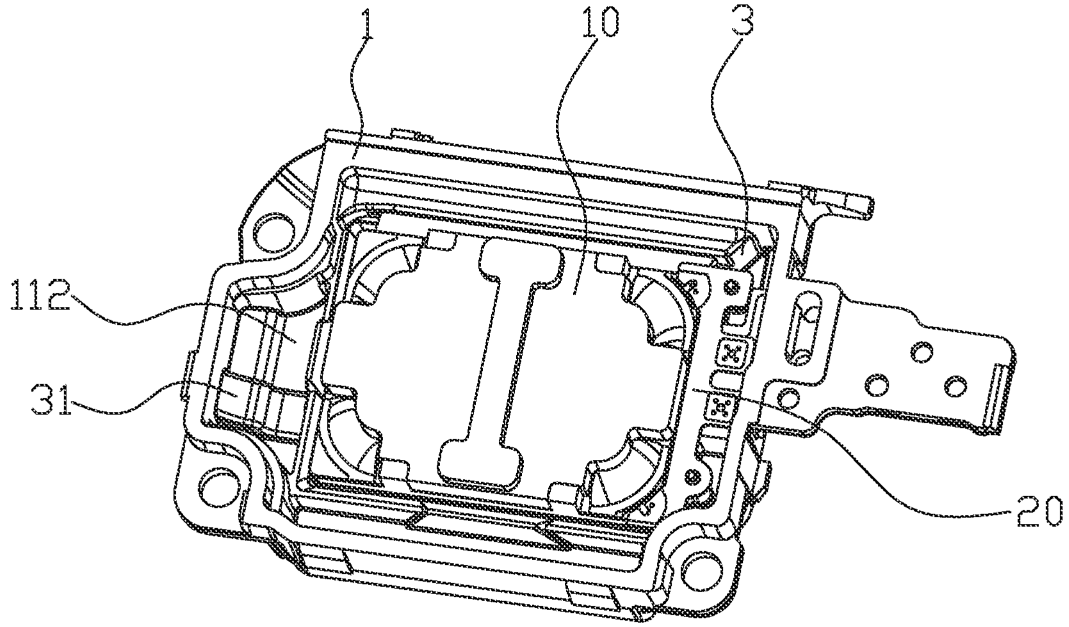
FIG. 2 is a schematic diagram of an assembly relationship among a sound-generating unit, a connector, and a front shell according to an embodiment of the disclosure.
Figure 3:
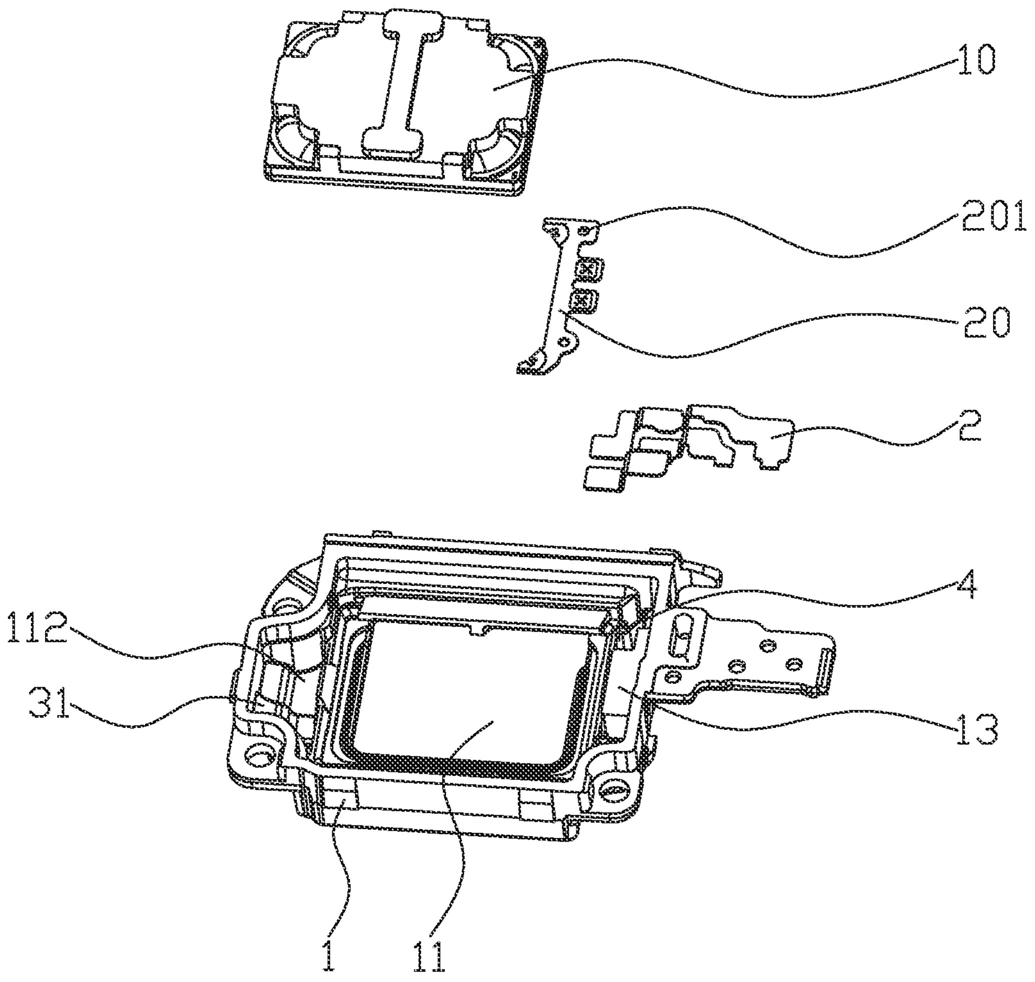
FIG. 3 is an exploded view of the sound-generating unit, the connector, and the front shell according to an embodiment of the disclosure.

Referring to FIG. 2 and FIG. 3, a speaker module includes a speaker module housing and a sound-generating unit 10 fixed in the speaker module housing. The sound-generating unit 10 is located between a gate region a and a fixed region b. The speaker module housing has an accommodating cavity 11. The sound-generating unit 10 is fixed in the accommodating cavity 11.

Referring to FIG. 2 and FIG. 3, the speaker module further includes an electrode sheet 2 fixed to a fixed region b and a connecting sheet 20 located in the accommodating cavity 11 and respectively electrically connected to the sound-generating unit 10 and the electrode sheet 2, and the connecting sheet 20 is fixedly connected to the front shell 1. Specifically, part of the electrode sheet 2 is exposed to a surface of the speaker module housing, and the connecting sheet 20 is respectively electrically connected to the electrode sheet 2 and the sound-generating unit 10, so as to realize an electrical connection between the electrode sheet 2 and the sound-generating unit 10.

Figure 1:
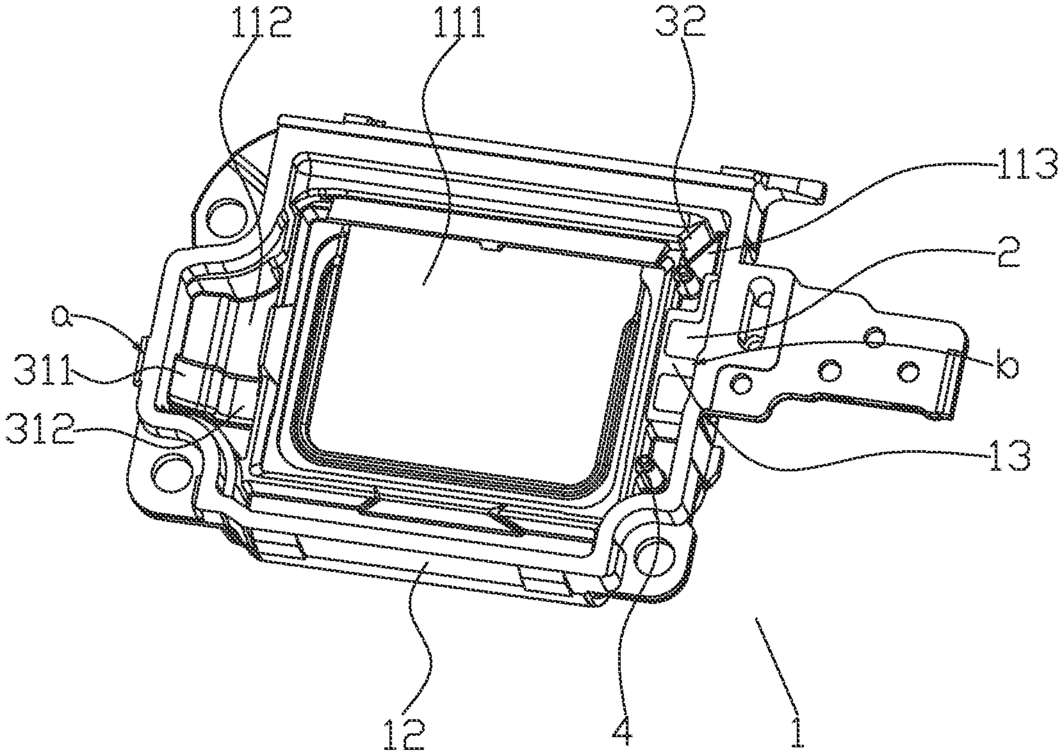
FIG. 1 is a schematic diagram of an overall structure of a front shell in a speaker module housing according to an embodiment of the disclosure.

Referring to FIG. 1, FIG. 2, and FIG. 3, the speaker module housing includes a front shell 1 with an accommodating cavity 11 and a back cover (not shown in the figures) fixed to the front shell 1 and covering the accommodating cavity 11. The front shell 1 has a gate region a for injection molding and a fixed region b opposite to the gate region a and away from the gate region a. A thickness of at least part of the front shell 1 between the gate region a and the fixed region b is smaller than a thickness of the fixed region b. The speaker module housing further includes a plastic structure 3 fixed in the accommodating cavity 11. The plastic structure 3 and the front shell 1 are integrally injection-molded, and the plastic structure 3 is located in the gate region a and/or the fixed region b.

The plastic structure 3 is arranged in the gate region a and/or the fixed region b of the front shell 1, so that a part of the front shell 1 located in the gate region a and the fixed region b has a sufficient plastic thickness, which prevents ineffective holding for thick glue in the fixed region b of the front shell 1 caused by quick freezing of plastic during the injection molding due to local excessively-thin plastic of the front shell 1, and compared with the related art, can extend an effective holding time of a shrinkage position of the front shell 1 and reduce a risk of shrinkage in the fixed region b of the front shell 1.

Referring to FIG. 1, in some embodiments, a thickness of the front shell 1 in the gate region a is smaller than a thickness in the fixed region b, and the plastic structure 3 includes a first plastic member 31 fixed to the front shell 1 and located in the gate region a. After the first plastic member 31 is arranged in the gate region a, the gate region a of the front shell 1 can be thickened, thereby extending the effective holding time of the fixed region b of the front shell 1 and reducing the risk of shrinkage. It should be understood that a freezing speed of the gate region a of the front shell 1, which is thinner, during the holding is higher than a freezing speed of the fixed region b of the front shell 1, thereby blocking an injection gate and making the holding ineffective for the thick glue in the fixed region b of the front shell 1.

Referring to FIG. 1 and FIG. 2, in some embodiments, the gate region a and the fixed region b are respectively located at two opposite ends of the front shell 1, and a length extending direction of the first plastic member 31 extends from the gate region a towards the fixed region b. That is, the length extending direction of the first plastic member 31 is the same as a flow direction of the plastic during the holding. The first plastic member 31 may be directly formed from the plastic injected during the holding, and there is no need to add excessive structures to a mold, which simplifies design of an injection mold of the front shell 1.

Referring to FIG. 1 and FIG. 2, in some embodiments, the accommodating cavity 11 includes a receiving cavity 111 and a first process cavity 112 spaced apart from the receiving cavity 111 and located in the gate region a, and the first plastic member 31 includes a first plastic body 311 connected to a cavity wall of the first process cavity 112 and a second plastic body 312 with two ends respectively connected to the first plastic body 311 and a cavity wall of the receiving cavity 111. Specifically, the sound-generating unit 10 is fixed in the receiving cavity 111. Since the first process cavity 112 and the receiving cavity 111 are spaced apart, flowing of the plastic during the holding is into the receiving cavity 111 is prevented. A step is formed on a bottom wall of the first process cavity 112, and an end of the step away from the cavity wall of the receiving cavity 111 is higher than an end of the step close to the cavity wall of the receiving cavity 111. The first plastic body 311 is arranged at the end of the step away from the cavity wall of the receiving cavity 111, and the second plastic body 312 is arranged at the end of the step close to the cavity wall of the receiving cavity 111, so that a height of the first plastic body 311 is greater than a height of the second plastic body 312, thereby facilitating the flowing of the plastic from the gate region a of the front shell 1 to the fixed region b of the front shell 1 during the holding. According to an actual requirement, the first plastic body 311 and the second plastic body 312 may both be rectangular blocks of a same thickness, and the first plastic member 31 only fills part of a space of the first process cavity 112.

Referring to FIG. 1 and FIG. 2, in some embodiments, the accommodating cavity 11 further includes a second process cavity 113 spaced apart from the receiving cavity 111 and opposite to the first process cavity 112, the fixed region b is located in the middle of the second process cavity 113, a thickness of the front shell 1 on an end portion of the second process cavity 113 is smaller than a thickness in the fixed region b, and the plastic structure 3 further includes a second plastic member 32 fixed to the end portion of the second process cavity 113. Specifically, the front shell 1 is in a shape of a rectangle, the end portion of the second process cavity 113 is a corner of the front shell 1, and the second plastic member 32 is arranged at the corner of the front shell 1, thereby thickening the corner of the front shell 1, which prevents blocking of a plastic flow channel due to rapid cooling at the corner caused by the thinner corner of the front shell 1, thereby increasing the effective holding time of the fixed region b of the front shell 1.

Referring to FIG. 1 and FIG. 2, in some embodiments, a surface on an end of the second plastic member 32 close to the fixed region b is a bevel surface. An inclination direction of the bevel surface is the same as the flow direction of the plastic during the holding, which can increase a thickness of a tip end of the corner of the front shell 1 and further prevent the blocking of the plastic flow channel due to rapid cooling at the corner caused by the thinner corner of the front shell 1. It is to be noted that, in the related art, there is also a risk of shrinkage at the corner of the front shell 1. In the solution, through the arrangement of the first plastic member 31 and the second plastic member 32, the risk of shrinkage of the fixed region b of the front shell 1 and the corner of the front shell 1 can be reduced at the same time.

Referring to FIG. 1, FIG. 2, and FIG. 3, in some embodiments, the front shell 1 includes a shell body 12 having an accommodating cavity 11 and a fixed portion 13 fixed to the shell body 12, and the fixed portion 13 forms the fixed region b on the shell body 12. Specifically, the fixed portion 13 may be a rectangular plastic block, and the two locating members 4 are distributed at two ends of the fixed portion 13. The electrode sheet 2 is fixed to the fixed portion 13, and the electrode sheet 2 is exposed to a surface of the fixed portion 13. Moreover, the connecting sheet 20 is in contact with and connected to an exposed part of the electrode sheet 2, thereby realizing an electrical connection between the sound-generating unit 10 and the electrode sheet 2.

Referring to FIG. 1, FIG. 2, and FIG. 3, in some embodiments, the speaker module housing further includes a locating member 4 fixed in the accommodating cavity 11, and the locating member 4 is configured to fix a speaker module. Specifically, the locating member 4 is fixed in the second process cavity 113, the connecting sheet 20 is provided with a positioning hole 201, and the locating member 4 is embedded in the positioning hole 201 to fix the connector to the front shell 1. The locating member 4 may be a positioning column. Through mutual coordination between the locating member 4 and the positioning hole 201, the connecting sheet 20 can be fixed to the speaker module housing, and it is also conducive to ensuring an accurate connection between the connecting sheet 20 and an exposed region of the electrode sheet 2. According to an actual requirement, two positioning holes 201 are provided and are respectively arranged at two ends of the connecting sheet 20, and two locating members 4 are correspondingly provided and are spaced apart from the fixed portion 13.

The above are merely the embodiments of the disclosure. It should be noted herein that, for those of ordinary skill in the art, improvements can be made without departing from the creative concept of the disclosure, but these all fall within the protection scope of the disclosure.

What is claimed is:

1. A speaker module housing, comprising:

a front shell with an accommodating cavity; and a back cover fixed to the front shell and covering the accommodating cavity, wherein the front shell has a gate region for injection molding and a fixed region opposite to the gate region and away from the gate region, and a thickness of at least part of the front shell located between the gate region and the fixed region is smaller than a thickness of the fixed region, wherein the speaker module housing further comprises a plastic structure fixed in the accommodating cavity, the plastic structure and the front shell are integrally injection-molded, and the plastic structure is located in the gate region and/or the fixed region;

a thickness of the front shell in the gate region is smaller than a thickness in the fixed region, and the plastic structure comprises a first plastic member fixed to the front shell and located in the gate region; the accommodating cavity comprises a receiving cavity and a first process cavity spaced apart from the receiving cavity and located in the gate region, and the first plastic member comprises a first plastic body connected to a cavity wall of the first process cavity and a second plastic body with two ends respectively connected to the first plastic body and a cavity wall of the receiving cavity.

2. The speaker module housing as described in claim 1, wherein the gate region and the fixed region are respectively located at two opposite ends of the front shell, and a length extending direction of the first plastic member extends from the gate region towards the fixed region.

3. The speaker module housing as described in claim 1, wherein the accommodating cavity further comprises a second process cavity spaced apart from the receiving cavity and opposite to the first process cavity, the fixed region is located in a middle of the second process cavity, a thickness of the front shell on an end portion of the second process cavity is smaller than a thickness in the fixed region, and the plastic structure further comprises a second plastic member fixed to the end portion of the second process cavity.

4. The speaker module housing as described in claim 3, wherein a surface on an end of the second plastic member close to the fixed region is a bevel surface.

5. The speaker module housing as described in claim 1, wherein the front shell comprises a shell body having an accommodating cavity and a fixed portion fixed to the shell body, and the fixed portion forms the fixed region on the shell body.

6. The speaker module housing as described in claim 1, further comprising a locating member fixed in the accommodating cavity, wherein the locating member is configured to fix a sound-generating unit of a speaker module.

7. A speaker module, comprising:

the speaker module housing as described in claim 1; and a sound-generating unit fixed in the speaker module housing, wherein the sound-generating unit is located between the gate region and the fixed region.

8. The speaker module as described in claim 7, further comprising an electrode sheet fixed to the fixed region and a connecting sheet located in the accommodating cavity and respectively electrically connected to the sound-generating unit and the electrode sheet, and the connecting sheet is fixedly connected to the front shell.

* * * * *